United States Patent
Maddox

(10) Patent No.: US 7,725,100 B2
(45) Date of Patent: May 25, 2010

(54) METHOD AND SYSTEM FOR INDICATING RECEPTION OF AN INCOMING CALL BY A WIRELESS DEVICE

(75) Inventor: James David Maddox, Little Rock, AR (US)

(73) Assignee: Alltell Communications, LLC., Wilmington, DE (US)

( * ) Notice: Subject to any disclaimer, the term of this patent is extended or adjusted under 35 U.S.C. 154(b) by 916 days.

(21) Appl. No.: 11/424,729

(22) Filed: Jun. 16, 2006

(65) Prior Publication Data

US 2007/0293196 A1    Dec. 20, 2007

(51) Int. Cl.
*H04M 3/42* (2006.01)

(52) U.S. Cl. ............................. 455/414.1; 379/142.01; 379/421

(58) Field of Classification Search ................. 455/567, 455/414.1; 379/142.05, 421, 142.01, 414.1
See application file for complete search history.

(56) References Cited

U.S. PATENT DOCUMENTS

| | | | | |
|---|---|---|---|---|
| 6,002,763 A | * | 12/1999 | Lester et al. | 379/421 |
| 6,418,330 B1 | * | 7/2002 | Lee | 455/567 |
| 6,697,470 B2 | * | 2/2004 | McDonough | 379/142.01 |
| 7,412,041 B2 | * | 8/2008 | Koskela | 379/142.05 |
| 2002/0141554 A1 | * | 10/2002 | McDonough | 379/142.01 |
| 2007/0293196 A1 | * | 12/2007 | Maddox | 455/414.1 |

* cited by examiner

*Primary Examiner*—William D Cumming
(74) *Attorney, Agent, or Firm*—McDermott Will & Emery LLP

(57) ABSTRACT

A method and a system indicate to a wireless device user that an incoming call has been received by the wireless device. The user can, for example, configure the wireless device to "shuffle" or select a different incoming call indicator, such as a ring tone, from a defined group of incoming call indicators, with each call received.

27 Claims, 3 Drawing Sheets

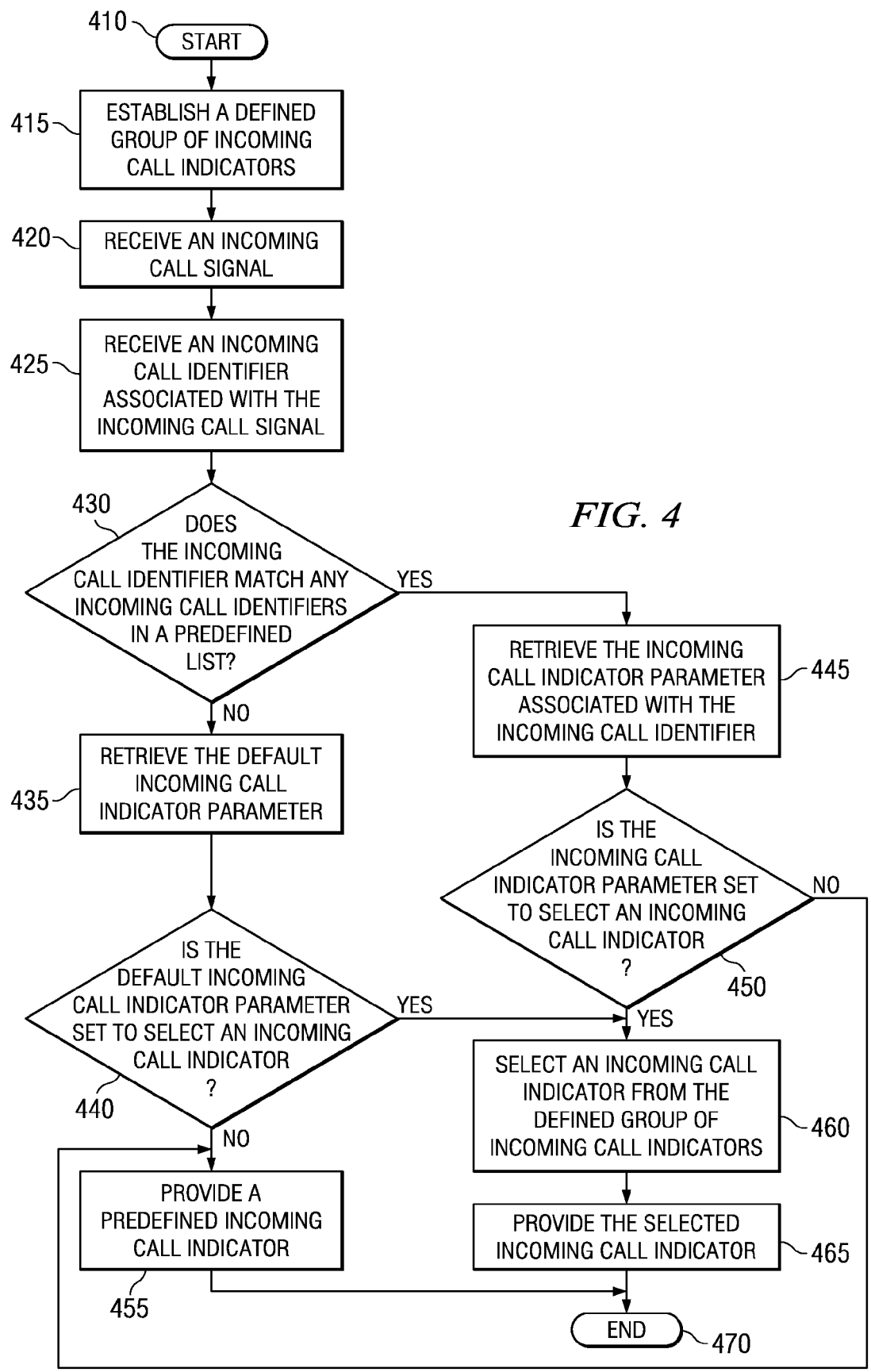

METHOD AND SYSTEM FOR INDICATING RECEPTION OF AN INCOMING CALL BY A WIRELESS DEVICE

TECHNICAL FIELD

The present disclosure generally relates to wireless communications and specifically relates to methods for alerting wireless device users that a call has been received.

BACKGROUND

A telephone rings. A telephone for the hearing impaired flashes a bright light. In these examples, the audible ring or visual flash of light indicate to the telephone user that a call has been received. To communicate with the caller, the telephone user must answer the phone, perhaps by picking up the handset. Without the audible ring, the visual flash of light, or some other indication that a call has been received, the telephone user would not know to answer the call and the opportunity for communication with the caller would be lost. Consequently, an indication that an incoming call has been received is a necessary element in telephonic and other types of communications.

Mobile telephones and other wireless devices generally arrive in the hands of users preconfigured with a particular means of indicating an incoming call. A typical device will produce an audible ring tone. Many of these devices also provide the user with the ability to select an alternate means of indicating that an incoming call has been received. The user may be able to select from a variety of ring tones, inaudible indicators such as vibrations or visual indicators, or other indicators. Some users may be able to purchase and download additional ring tones and other indicators for use with their devices. These downloaded call indicators can typically be stored on the device, allowing the user to reconfigure the device to use the downloaded ring tone or other incoming call indicator at a later time.

Some wireless devices are configurable to select a particular ring tone or other incoming call indicator for a particular incoming caller. For example, an incoming call from Caller A may be announced with Ring Tone A, an incoming call from Caller B may be announced with Ring Tone B, while an incoming call from an unknown caller may be announced with Ring Tone C. In this example, once the user configures the device to indicate an incoming call from Caller A with Ring Tone A, Ring Tone A will always announce Caller A until the user reconfigures the device to provide a different incoming call indicator for Caller A.

BRIEF SUMMARY

One aspect of the disclosed invention is to provide for the selection of an incoming call indicator from a group of incoming call indicators, thus eliminating the fixed association of a single incoming call indicator with the reception of an incoming call, and further eliminating the fixed association of a single incoming call indicator with the reception of an incoming call from a particular caller. Even the most flexible and configurable of existing devices provide only the ability to assign a single persistent incoming call indicator to a particular incoming caller. This persistent incoming call indicator will always announce an incoming call from the particular caller unless the user reconfigures the device to assign a different incoming call indicator for that particular caller. With embodiments of the disclosed invention, the user is no longer constrained by this limitation and can configure the device to select an incoming call indicator from a defined group of indicators, resulting in the possibility of a different incoming call indicator announcing consecutive incoming calls from the same caller.

BRIEF DESCRIPTION OF THE DRAWINGS

FIG. 4 is a process flow diagram depicting a representative process for indicating reception of an incoming call.

DETAILED DESCRIPTION

Various aspects of a method and system for indicating reception of an incoming call by a wireless device according to the present disclosure are described. It is to be understood, however, that the following explanation is merely exemplary in describing aspects of the present disclosure. Accordingly, several modifications, changes, and substitutions are contemplated.

Figure 1:
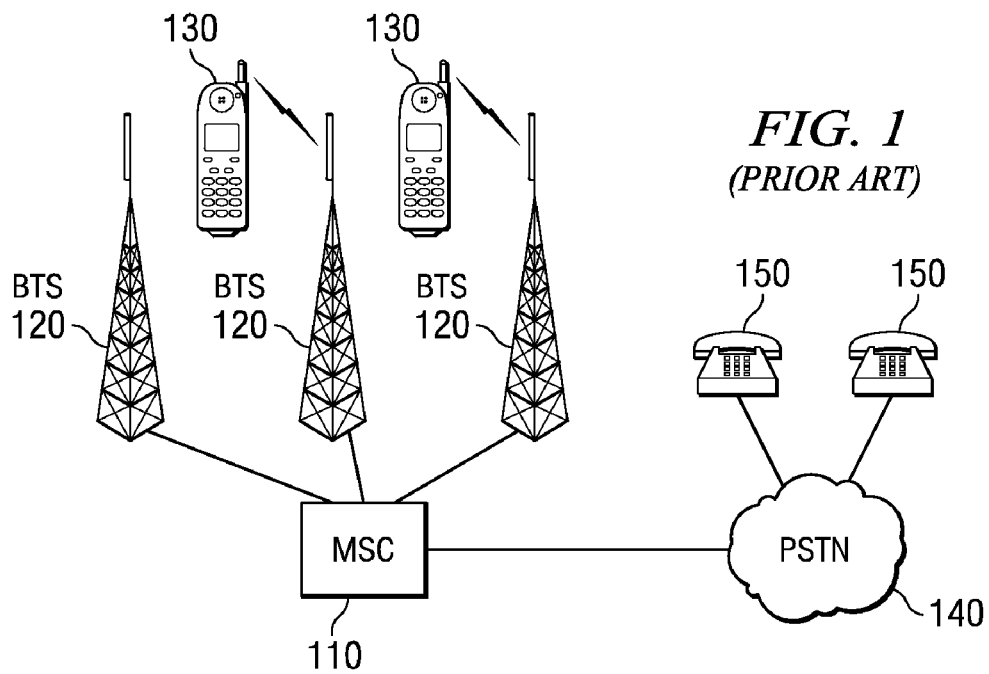
FIG. 1 illustrates a representative wireless communications network suitable for facilitating the reception of an incoming call by a wireless device.

FIG. 1 illustrates a representative wireless communications network suitable for facilitating the reception of an incoming call by a wireless device. In FIG. 1, wireless devices 130 are serviced by Mobile Switching Center (MSC) 110. MSC 110 is connected to a plurality of Base Transceiver Stations (BTSs) 120. The BTSs are divided into unique areas and communicate with wireless devices 130 located within these unique areas. In this configuration, wireless devices 130 can receive incoming calls from other wireless devices serviced by MSC 110 or other MSCs not shown in FIG. 1. MSC 110 is further connected to Public Switched Telephone Network (PSTN) 140. This connection enables wireless devices 130 to receive incoming calls from devices connected to PSTN 140, such as the wired devices 150 shown in FIG. 1. The wireless communications network shown in FIG. 1 is only one example of a network suitable for facilitating the reception of an incoming call by a wireless device and the claimed method and system for indicating reception of an incoming call by a wireless device is in no way limited by the means in which such reception is accomplished.

Figure 2:
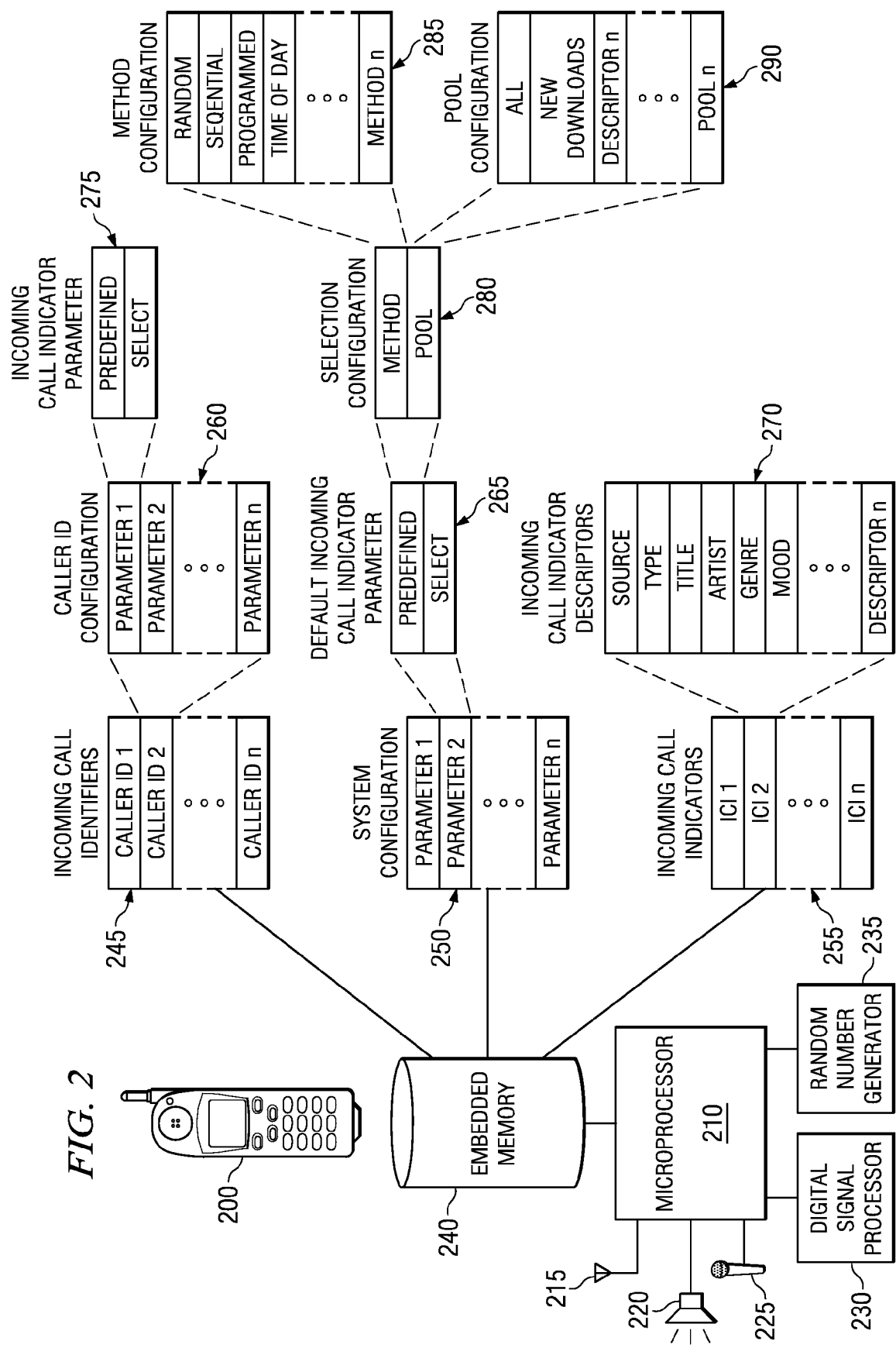
FIG. 2 is a block diagram illustrating a representative memory and processor configuration suitable for facilitating the selection of an incoming call identifier on a wireless device.

FIG. 2 is a block diagram illustrating a representative memory and processor configuration suitable for facilitating the selection of an incoming call identifier on a wireless device. In this representative embodiment, wireless device 200 comprises a processor 210, a microphone 225 and a memory 240. A processor 210, through an antenna 215, is configured to detect incoming call signals, to receive incoming call identifiers associated with incoming call signals, and to announce reception of such incoming call signals by providing an incoming call indicator through a speaker 220. Another digital processor 230 may be employed other than the processor 210 to perform various functions related to selection of incoming call indicators. Other embodiments of the disclosed invention contemplate provision of an incoming call indicator through other notification systems. Such notification systems include, but are not limited to, vibrators and visual displays.

Memory 240 in this representative embodiment is configured to store a plurality of incoming call indicators 255. These stored incoming call indicators include, but are not limited to, ring tones, other audible indicators, palpable indicators such as vibrations, and visual indicators such as flashes of light. In some embodiments, memory 240 is further configured to store descriptors 270 associated with each stored incoming call indicator. These descriptors provide additional information about the stored incoming call indicators, such as whether the indicator was preloaded on the device or whether the user downloaded it. For example, descriptors for musical ring tone indicators can provide the artist and title of the indicator and the genre and mood associated with the musical ring tone; descriptors for visual indicators can provide information about the visual display, such as the color or pattern of light flashes; and descriptors for palpable indicators can provide the intensity or pattern of vibrations produced.

Also stored in memory 240 in this representative embodiment are system configuration parameters 250. In a preferred embodiment of the disclosed invention, default incoming call indicator parameter 265 is used to control the manner in which incoming calls are announced to the user. If default incoming call indicator parameter 265 is set to a predefined incoming call indicator, then whenever the device receives an incoming call, that predefined incoming call indicator is provided through the device. Alternatively, if default incoming call indicator parameter 265 is set to select an incoming call indicator, then whenever the device receives an incoming call, an incoming call indicator is selected from a defined group of incoming call indicators. In some embodiments this defined group of incoming call indicators may be the entire stored group of incoming call indicators 255, in other embodiments this defined group may be a subset of the entire group.

When default incoming call indicator parameter 265 is set to select an indicator from a defined group of indicators, one embodiment of the disclosed invention provides for additional selection configuration parameters 280. These additional configuration parameters can include, but are not limited to, method configuration 285 and pool configuration 290. In this embodiment, the method configuration controls how the incoming call indicator is selected, while the pool configuration controls which stored incoming call indicators are candidates for selection. The method configuration may comprise random selection, sequential selection, programmed selection, time-of-day selection, or any other means for selecting the incoming call indicator. Furthermore, these particular selection methods may themselves comprise a variety of more specific methods. A sequential selection method, for example, might be based on a numerical list of indicators, an alphabetical list of indicators, a list of indicators according to file size, or any other criteria. The pool configuration may comprise an artist pool, a genre pool, an inaudible pool, or any other means of grouping the incoming call indicators.

For example, if the method configuration is set to "random" and the pool configuration is set to "all," then the processor may generate a random number between 1 and the total number of indicators stored in memory, and the incoming call indicator stored at the random location may be provided to announce the received incoming call. The random number may be generated by a random number generator 235. On receipt of the next incoming call, the process is repeated. For a second example, if the method configuration is set to "sequential" and the pool configuration is set to "Artist A," then the first stored incoming call indicator with artist descriptor "Artist A" may be provided to announce the received incoming call. The second stored incoming call indicator with artist descriptor "Artist A" may be provided to announce the next received incoming call. For a third example, if the method configuration is set to "sequential" and the pool configuration is set to "Artist A," then the first alphabetical entry in the incoming call indicator list with artist descriptor "Artist A" may be provided to announce the received incoming call. The second alphabetical entry in the incoming call indicator list with artist descriptor "Artist A" may be provided to announce the next received incoming call.

In other embodiments of the disclosed invention, additional selection configuration parameters 280 may not be provided. In such an embodiment, the device is configured to select an incoming call indicator from a defined group in a less user-configurable way. For example, an incoming call indicator may always be selected at random from the entire stored group of indicators. A second example is that an incoming call indicator may always be selected based on the time of day from a particular user-defined subset of the entire group of indicators.

In a further aspect of the embodiment contemplated by FIG. 2, memory 240 is configured to store a list of incoming call identifiers 245, where each entry in the list is associated with a unique caller. This list can be described as an address book, a contact list, or some other description that indicates that the entries in the list are familiar callers to the user. Memory 240 is further configured to store configuration parameters 260 associated with each unique caller listed. In a preferred embodiment of the disclosed invention, each unique caller is assigned an incoming call indicator parameter 275. Incoming call indicator parameter 275 controls the manner in which incoming calls from its associated caller are announced to the user. If incoming call indicator parameter 275 is set to a predefined incoming call indicator, then whenever the device receives an incoming call from this particular caller, that predefined incoming call indicator is provided through the device. However, if incoming call indicator parameter 275 is set to select an incoming call indicator, then whenever the device receives an incoming call from this particular caller, an incoming call indicator is selected from a defined group of incoming call indicators 255, also stored in the device's memory. In the same way as additional selection configuration parameters 280 were described in relation to default incoming call indicator parameter 265, additional selection configuration parameters 280 are contemplated for incoming call indicator parameter 275.

In embodiments providing both default incoming call indicator parameter 265 and caller-specific incoming call indicator parameters 275, the preferred embodiment is for the caller-specific incoming call indicator parameter 275 to control whether the provided incoming call indicator is predefined or selected when the device receives an incoming call associated with the specific caller. When the device receives an incoming call not associated with any caller listed in the stored incoming call identifiers 245, or when no incoming call identifiers are stored on the device, then the default incoming call indicator parameter 265 controls whether the provided incoming call indicator is predefined or selected.

Figure 3:
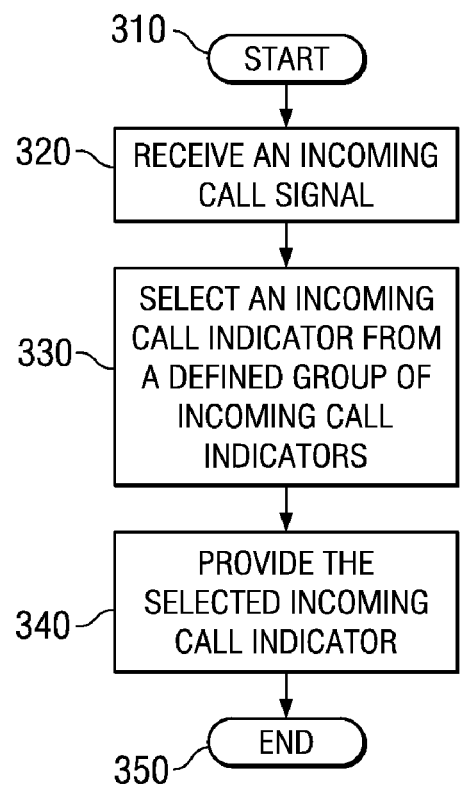
FIG. 3 is a process flow diagram depicting a representative process for indicating reception of an incoming call.

FIG. 3 is a process flow diagram depicting a representative process for indicating reception of an incoming call according to the present disclosure. In this embodiment, a wireless device receives 320 an incoming call signal, selects 330 an incoming call indicator from a defined group of incoming call indicators, and provides 340 the selected incoming call indicator through the wireless device. In this embodiment, the defined group of incoming call indicators is predetermined. For example, the defined group of incoming call indicators may be a set of ring tones or other indicators that are stored on the device prior to delivery to the user, although other predetermined groups are contemplated.

The present disclosure does not require that reception 320 of an incoming call signal occur before selection 330 of an incoming call indicator. Other embodiments contemplate that the selection process occurs prior to reception of an incoming call. All embodiments do contemplate, however, the selection 330 of an incoming call indicator, rather than simply providing a predefined incoming call indicator through the device. For example, a device configured to select an incoming call indicator from a defined group of incoming call indicators may select the indicator after the call is received. Alternatively, such a device may select the indicator before the call is received and store the selected indicator in memory. When the call is received the device can then provide the previously selected indicator through the device.

FIG. 4 is also a process flow diagram depicting a representative process for indicating reception of an incoming call according to the present disclosure. In this embodiment, a defined group of incoming call indicators is established 415 prior to the reception 420 of an incoming call signal. This group of indicators may be established by the user, for example by downloading ring tones or other indicators for storage on the device. In this example, the established defined group may consist of only the downloaded indicators, or may consist of the downloaded indicators in addition to a default group of ring tones or other call identifiers that are stored on the device prior to delivery to the user. These representative examples do not preclude other methods of establishing a group of incoming call identifiers. In addition, the present disclosure does not require that establishment 415 of a defined group of incoming call indicators occur prior to reception 420 of an incoming call signal. Other embodiments contemplate that the establishment process occur after reception of an incoming call.

According to the embodiment shown in FIG. 4, an incoming call identifier associated with the incoming call signal is received 425 on the wireless device. This identifier allows the device to determine 430 whether the particular caller is one known to the user. In a preferred embodiment, the user will have previously established a list of incoming call identifiers, commonly called an address book or a contact list. If the incoming call identifier associated with the incoming call signal is one that is stored in the user's list of known incoming callers, then the incoming call indicator parameter associated with the caller is retrieved 445. It is determined whether the incoming call indicator parameter is configured to select an incoming call indicator from a defined group of incoming call indicators 450. If the incoming call indicator parameter is configured to select an incoming call indicator from a defined group, then the device will select 460 an indicator according to user-defined configuration parameters or according to a preset method, and then the device will provide the selected incoming call indicator through the wireless device 465. If the incoming call indicator parameter is not configured to select an incoming call indicator from a defined group, then the device will provide 455 a predefined incoming call indicator through the wireless device.

For example, if the wireless device receives a call from Caller A, and Caller A is listed in the user's address book, contact list, or other such list of known callers, and if the incoming call indicator parameter is set to always provide Ring Tone A for calls received from Caller A, then the device will provide 455 Ring Tone A and no selection 460 occurs. However, if the incoming call indicator parameter for Caller A is set to select an incoming call indicator parameter for Caller A, then the device will select 460 an indicator and provide 465 the selected indicator.

If the particular caller is not known to the user, then a default incoming call indicator parameter is retrieved 435. It is determined whether the default incoming call indicator is configured to select an incoming call indicator from a defined group of incoming call indicators 440. If the default incoming call indicator parameter is configured to select an incoming call indicator from a defined group, then the device will select 460 an indicator according to user-defined configuration parameters or according to a preset method. If the default incoming call indicator parameter is not configured to select an incoming call indicator from a defined group, then the device will provide 455 a predefined incoming call indicator through the wireless device.

For example, if the wireless device receives a call from Caller A, and Caller A is not listed in the user's address book, contact list, or other such list of known callers, and if the default incoming call indicator parameter is set to always provide Ring Tone A for calls received from unknown callers, then the device will provide 455 Ring Tone A and no selection 460 occurs. However, if the default incoming call indicator parameter for unknown callers is set to select an incoming call indicator parameter for unknown callers, then the device will select 460 an indicator and provide 465 the selected indicator.

While various embodiments of a method and system for indicating reception of an incoming call by a wireless device have been described above, it should be understood that they have been presented by way of example only, and not limitation. Thus, the breadth and scope of the invention should not be limited by any of the above-described exemplary embodiments, but should be defined only in accordance with the following claims and their equivalents. Moreover, the above advantages and features are provided in described embodiments, but shall not limit the application of the claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

I claim:

1. A method for indicating that a wireless device has received an incoming call signal, the method comprising:
    establishing a defined group of incoming call indicators;
    receiving the incoming call signal on the wireless device;
    receiving an incoming call identifier associated with the incoming call signal;
    comparing the received incoming call identifier to a predefined list of incoming call identifiers;

if a match is found, then performing the following steps a) through c);
  a) retrieving an incoming call indicator parameter associated with the incoming call identifier;
  b) if the retrieved incoming call indicator parameter indicates that the incoming call indicator should be selected from the defined group of incoming call indicators, then selecting the incoming call indicator from the defined group of incoming call indicators and providing the selected incoming call indicator through the wireless device;
  c) if the retrieved incoming call indicator parameter does not indicate that the incoming call indicator should be selected from the defined group of incoming call indicators, then providing a predefined incoming call indicator through the wireless device;
if a match is not found, then performing the following steps aa) through cc);
  aa) retrieving a default incoming call indicator parameter;
  bb) if the retrieved default incoming call indicator parameter indicates that the incoming call indicator should be selected from the defined group of incoming call indicators, then selecting the incoming call indicator from the defined group of incoming call indicators and providing the selected incoming call indicator through the wireless device;
  cc) if the retrieved default incoming call indicator parameter does not indicate that the incoming call indicator should be selected from the defined group of incoming call indicators, then providing a predefined incoming call indicator through the wireless device.

2. A wireless device comprising:
a memory configured to store a defined group of incoming call indicators;
a notification system; and
a processor controlling the notification system, the processor being configured to make the wireless device capable of responding to received incoming calls to implement functions comprising:
to receive an incoming call signal on the wireless device for each incoming call;
to receive an incoming call identifier associated with each incoming call signal;
to compare each received incoming call identifier to a predefined list of incoming call indentifiers;
to select an incoming call indicator for output via the notification system according to an incoming call indicator parameter associated with the incoming call identifier for a first call, if a match is found between the incoming call identifier for the first call and the defined group of incoming call identifiers, wherein:
if the incoming call indicator parameter for the first call indicates that the incoming call indicator should be selected from the defined group of incoming call indicators, then the incoming call indicator for output via the notification system is selected from the defined group of incoming call indicators;
if the incoming call indicator parameter for the first call does not indicate that the incoming call indicator should be selected from the defined group of incoming call indicators, then a predefined incoming call indicator is selected for output via the notification system; and
to select an incoming call indicator for output via the notification system according to a default call indicator parameter for a second call, if a match is not found between the incoming call identifier for the second call and the defined group of incoming call identifiers.

3. The wireless device of claim 2, wherein the notification system comprises a speaker.

4. The wireless device of claim 2, wherein the notification system comprises a vibrator.

5. The wireless device of claim 2, wherein the notification system comprises a visual display.

6. The wireless device of claim 2, wherein the memory is further configured to store at least one system configuration parameter.

7. The wireless device of claim 6, wherein the at least one system configuration parameter comprises the default call indicator parameter.

8. The wireless device of claim 2, wherein the memory is further configured to store a predefined list of incoming call identifiers.

9. The wireless device of claim 8, wherein the predefined list of incoming call identifiers comprises at least one incoming call identifier configuration parameter associated with each incoming call identifier.

10. The wireless device of claim 9, wherein each incoming call identifier configuration parameter associated with an incoming call identifier comprises an incoming call indicator parameter.

11. A wireless device comprising:
a memory configured to store a defined group of incoming call indicators;
a notification system; and
a processor controlling the notification system, the processor being configured to make the wireless device capable of responding to received incoming calls to implement functions comprising:
to receive an incoming call signal on the wireless device for each incoming call;
to receive an incoming call identifier associated with each incoming call signal;
to compare each received incoming call identifier to a predefined list of incoming call identifiers;
to select an incoming call indicator for output via the notification system according to an incoming call indicator parameter associated with the incoming call identifier for a first call, if a match is found between the incoming call identifier for the first call and the defined group of incoming call identifiers; and
to select an incoming call indicator for output via the notification system according to a default call indicator parameter for a second call, if a match is not found between the incoming call identifier for the second call and the defined group of incoming call identifiers, wherein:
if the default incoming call indicator parameter for the second call indicates that the incoming call indicator should be selected from a defined group of incoming call indicators, then the incoming call indicator is selected for output via the notification system from the defined group of incoming call indicators; and
if the default incoming call indicator parameter for the second call does not indicate that the incoming call indicator should be selected from the defined group of incoming call indicators, then a predefined incoming call indicator is selected for output via the notification system.

12. A method for indicating that a wireless device has received incoming calls, the method comprising steps of:
receiving an incoming call signal on the wireless device for each incoming call;

receiving an incoming call identifier associated with each incoming call signal;

comparing each received incoming call identifier to a predefined list of incoming call identifiers;

selecting an incoming call indicator according to an incoming call indicator parameter associated with the incoming call identifier for a first call, if a match is found between the incoming call identifier for the first call and the defined group of incoming call identifiers;

selecting an incoming call indicator according to a default call indicator parameter for a second call, if a match is not found between the incoming call identifier for the second call and the defined group of incoming call identifiers; and providing the selected incoming call indicators through the wireless device, wherein:

if the incoming call indicator parameter for the first call indicates that the incoming call indicator should be selected from a defined group of incoming call indicators, then selecting the incoming call indicator from the defined group of incoming call indicators and providing the selected incoming call indicator through the wireless device; and if the incoming call indicator parameter for the first call does not indicate that the incoming call indicator should be selected from the defined group of incoming call indicators, then providing a predefined incoming call indicator through the wireless device.

13. A method for indicating that a wireless device has received incoming calls, the method comprising steps of:

receiving an incoming call signal on the wireless device for each incoming call;

receiving an incoming call identifier associated with each incoming call signal;

comparing each received incoming call identifier to a predefined list of incoming call identifiers;

selecting an incoming call indicator according to an incoming call indicator parameter associated with the incoming call identifier for a first call, if a match is found between the incoming call identifier for the first call and the defined group of incoming call identifiers;

selecting an incoming call indicator according to a default call indicator parameter for a second call, if a match is not found between the incoming call identifier for the second call and the defined group of incoming call identifiers; and providing the selected incoming call indicators through the wireless device, wherein:

if the default incoming call indicator parameter for the second call indicates that the incoming call indicator should be selected from a defined group of incoming call indicators, then selecting the incoming call indicator from the defined group of incoming call indicators and providing the selected incoming call indicator through the wireless device; and if the default incoming call indicator parameter for the second call does not indicate that the incoming call indicator should be selected from the defined group of incoming call indicators, then providing a predefined incoming call indicator through the wireless device.

14. The method of either claim 12 or claim 13, wherein the defined group of incoming call indicators is predetermined.

15. The method of claim 14, further comprising establishing the defined group of incoming call indicators prior to receiving the incoming call signal on the wireless device.

16. The method of claim 14, wherein establishing the defined group of incoming call indicators comprises downloading at least one incoming call indicator to the wireless device.

17. The method of claim 14, wherein the defined group of incoming call indicators comprises a predetermined group of incoming call indicators and at least one incoming call indicator that has been downloaded to the wireless device.

18. The method of claim 14, wherein selecting the incoming call indicator from the defined group of incoming call indicators comprises randomly selecting the incoming call indicator from the defined group of incoming call indicators.

19. The method of claim 14, wherein selecting the incoming call indicator from the defined group of incoming call indicators comprises sequentially selecting the incoming call indicator from the defined group of incoming call indicators.

20. The method of claim 19, wherein sequentially selecting the incoming call indicator from the defined group of incoming call indicators comprises selecting the next numerical entry in the defined group.

21. The method of claim 19, wherein sequentially selecting the incoming call indicator from the defined group of incoming call indicators comprises selecting the next alphabetical entry in the defined group.

22. The method of claim 14, wherein the selected incoming call indicator comprises an audible call indicator.

23. The method of claim 22, wherein the audible call indicator comprises a ring tone.

24. The method of claim 14, wherein the selected incoming call indicator comprises an inaudible call indicator.

25. The method of claim 24, wherein the inaudible call indicator comprises a palpable indicator.

26. The method of claim 25, wherein the palpable indicator comprises a vibration.

27. The method of claim 24, wherein the inaudible call indicator comprises a visual indicator.

* * * * *